Patented May 18, 1937

2,080,558

UNITED STATES PATENT OFFICE 2,080,558

DISPERSIONS OF HALOGEN-2-BUTADIENE 1,3 AND THE PROCESS OF MAKING SAME

Wallace Hume Carothers, Wilmington, Del., assignor to E. I. du Pont de Nemours & Company, Wilmington, Del., a corporation of Delaware No Drawing. Application August 8, 1934, Serial No. 738,931

26 Claims. (Cl. 260—6)

This invention relates to the preparation of new dispersions of halogen-2-butadienes-1,3. More particularly it relates to the preparation of stable dispersions of halogen-2-butadiene-1,3 in a medium which is non-aqueous, or chiefly non-aqueous. Still more particularly it relates to the preparation of non-aqueous, or chiefly non-aqueous, dispersions of chloro-2-butadiene-1,3 polymers and bromo-2-butadiene-1,3 polymers.

The preparation of the halogen-2-butadienes-1,3 which are used in the process of the present invention is described in U. S. Patent No. 1,950,431. The making of aqueous dispersions of halogen-2-butadiene-1,3 polymer is described in a copending application of Collins, Serial No. 537,484, filed May 14, 1931. Acid aqueous dispersions of these substances have been described by Kirby in a copending application, Serial No. 572,739, filed November 2, 1931.

It is an object of the present invention to prepare stable dispersions of halogen-2-butadiene-1,3 in a medium which is non-aqueous, or chiefly non-aqueous. Another object is to polymerize halogen-2-butadiene-1,3 in a medium which is non-aqueous, or chiefly non-aqueous. A still further object is the preparation of dispersions of chloro-2-butadiene-1,3 polymer in glycerol. Other objects will appear hereinafter.

It has now been found that the halogen-2-butadienes-1,3 may be readily emulsified in certain non-aqueous media, using various emulsifying agents. The emulsion may contain sufficient water to assist in the solution of the emulsifying agent.

The following examples are intended to be construed as illustrative only and not as limiting the scope of the invention.

Example 1

200 parts of chloro-2-butadiene-1,3 are emulsified by high speed stirring or other violent agitation in a solution of 4 parts of sodium oleate in 10% water solution and 160 parts of glycerine. Polymerization of the dispersed monomer is allowed to take place under careful temperature control, the rate being about the same as for aqueous dispersions.

Example 2

200 parts of chloro-2-butadiene-1,3 are emulsified in a solution of 4 parts of sodium oleate in 200 parts of glycerin. Polymerization is allowed to take place as in the other example.

The usual stabilizing agents may be added. By way of illustration to the products of Examples 1 and 2 above, 3 parts of 29% ammonium hydroxide and 5 parts of a 50% dispersion of ethyl or phenyl-beta-naphthylamine may be added.

The chloro-2-butadiene-1,3 polymer may be coagulated from these latices by acids or by alcohol or separated by filtration through porous porcelain. The organic liquid may be removed from the coagulum by washing on the rolls of a rubber washing mill with water or with alcohol.

Although only chloro-2-butadiene-1,3 has been used in the above examples it will be understood that the invention is not to be so limited. The chloro-2-butadiene-1,3 may be replaced by any of the halogen-2-butadienes-1,3.

As the non-aqueous dispersing medium any non-aqueous liquid may be used in which the halogen-2-butadiene-1,3 is insoluble and which does not prevent the polymerization of the halogen-2-butadiene-1,3. It is to be understood that media which merely retard the polymerization but do not prevent it are to be included within the scope of this invention. Examples of other materials which, under certain circumstances, may be used in place of the glycerin in the above examples are: ethylene glycol and formamide.

In place of the sodium oleate in the above examples any of the well known emulsifying agents may be used; such as, for example, alkali metal salts of alkyl naphthalene sulfonic acids or the improved emulsifying agents recently described, which comprise all of the alkali metal salts of the sulfuric acid esters of the normal straight-chain primary aliphatic alcohols containing more than 8 carbon atoms. In certain cases it may be necessary, or desirable, to add just sufficient water to the dispersion to dissolve the emulsifying agent, as illustrated in Example 1, above.

The amount of emulsifying agent to be used is susceptible to rather wide variation. Amounts ranging from 1% to 3%, based on the halogen-2-butadiene-1,3, have given good results. Greater amounts may be used but they are ordinarily unnecessary. 2% on the same basis is the amount usually employed.

The dispersed halogen-2-butadiene-1,3 polymerizes just as it does in aqueous dispersions and heat, pressure and the presence of catalysts, inhibitors, alkalies, oxygen and oxidizing agents have effects similar to those on aqueous dispersions. The particle size in these emulsions of halogen-2-butadiene-1,3 is of the same order of magnitude as that of the aqueous dispersions.

Stable dispersions containing as high as 60% of halogen-butadiene polymer may be obtained in glycerin, for example. The dispersions containing from 40% to 50% of polymer have, however, been found to be most satisfactory.

As indicated above the dispersions of polymer may be coagulated in the usual manner to yield a polymer similar to that produced by polymerizing in the presence of water. Any material which may be dispersed in the same non-aqueous liquid as the halogen-2-butadiene-1,3 to give dispersed particles bearing a negative charge may be added to the latices of this invention. Thus by the process of this invention a wide variety of latices may be obtained.

It is apparent that many widely different embodiments of this invention may be made without departing from the spirit and scope thereof, therefore, this invention is not to be limited except as indicated in the appended claims.

I claim:
1. A dispersion comprising halogen-2-butadiene-1,3 dispersed in an organic liquid which is a non-solvent for the halogen-2-butadiene-1,3 and is not capable of preventing the polymerization of the halogen-2-butadiene-1,3.

2. A dispersion comprising chloro-2-butadiene-1,3 dispersed in a liquid of the group consisting of glycerin, ethylene glycol, and formamide is insoluble and which liquid does not prevent the polymerization of the chloro-2-butadiene-1,3.

3. A dispersion comprising a polymer of halogen-2-butadiene-1,3 dispersed in an organic liquid which is a non-solvent for the halogen-2-butadiene-1,3 and is not capable of preventing the polymerization of the halogen-2-butadiene-1,3.

4. A dispersion comprising a polymer of chloro-2-butadiene-1,3 dispersed in an organic liquid which is a non-solvent for the chloro-2-butadiene-1,3 and is not capable of preventing the polymerization of the chloro-2-butadiene-1,3.

5. A dispersion comprising chloro-2-butadiene-1,3 dispersed in glycerin.

6. A dispersion comprising chloro-2-butadiene-1,3 polymer dispersed in glycerin.

7. The product described in claim 5 characterized in that it contains sodium oleate as an emulsifying agent.

8. The product described in claim 6 characterized in that it contains sodium oleate as an emulsifying agent.

9. A process which comprises forming a dispersion of a halogen-2-butadiene-1,3 in an organic liquid as the continuous phase, which organic liquid is a non-solvent for the halogen-2-butadiene-1,3 and is not capable of preventing the polmerization of the halogen-2-butadiene-1,3.

10. A process which comprises dispersing chloro-2-butadiene-1,3 in a liquid of the group consisting of glycerin, ethylene glycol, and formamide is insoluble and which liquid does not prevent the polymerization of the chloro-2-butadiene-1,3.

11. A process which comprises forming a dispersion of a halogen-2-butadiene-1,3 in an organic liquid as the continuous phase, which organic liquid is a non-solvent for the halogen-2-butadiene-1,3 and is not capable of preventing the polymerization of halogen-2-butadiene-1,3 and then polymerizing the dispersed halogen-2-butadiene-1,3.

12. A process which comprises forming a dispersion of chloro-2-butadiene-1,3 in an organic liquid as the continuous phase, which organic liquid is a non-solvent for the chloro-2-butadiene-1,3 and is not capable of preventing the polymerization of the chloro-2-butadiene-1,3 and then polymerizing the dispersed chloro-2-butadiene-1,3.

13. The process of claim 11 characterized in that an emulsifying agent has been added to the liquid prior to the dispersion of the halogen-2-butadiene-1,3.

14. A dispersion comprising chloro-2-butadiene-1,3 polymer dispersed in a liquid of the group consisting of glycerin and ethylene glycol and formamide.

15. A process which comprises dispersing chloro-2-butadiene-1,3 in glycerin in the presence of an emulsifying agent and then polymerizing the dispersed chloro-2-butadiene-1,3.

16. The process which comprises dispersing chloro-2-butadiene-1,3 in a liquid of the group consisting of glycerin, ethylene glycol and formamide and then polymerizing the dispersed chloro-2-butadiene-1,3.

17. The process which comprises dispersing from 40 to 60%, based on the weight of the resulting dispersion, of chloro-2-butadiene-1,3 in glycerin in the presence of 1 to 3%, based on the chlorobutadiene, of sodium oleate in water solution and thereafter polymerizing the dispersed chlorobutadiene under careful temperature control.

18. The process which comprises dispersing from 40 to 60%, based on the weight of the resulting dispersion, of chloro-2-butadiene-1,3 in glycerin in the presence of 1 to 3%, based on the chlorobutadiene of sodium oleate and thereafter polymerizing the dispersed chlorobutadiene under careful temperature control.

19. The process of claim 15 characterized in that after polymerization the dispersion is made alkaline with ammonium hydroxide solution and an antioxidant is added.

20. The process of claim 15 characterized in that after polymerization the polymer is separated from the dispersing medium and then washed.

21. The process which comprises dispersing 200 parts of chloro-2-butadiene-1,3 in about 160 parts of glycerin containing about 4 parts of sodium oleate, in 10% water solution, and then polymerizing the dispersed chloro-2-butadiene-1,3 under careful temperature control.

22. The process which comprises dispersing 200 parts of chloro-2-butadiene-1,3 in a solution of about 4 parts of sodium oleate in about 200 parts of glycerin and then polymerizing the dispersed chloro-2-butadiene-1,3 under careful temperature control.

23. The dispersion described in claim 3 further characterized in that it contains an emulsifying agent and an amount of water not substantially exceeding that amount required to dissolve the emulsifying agent present.

24. The dispersion described in claim 14 further characterized in that it contains an emulsifying agent and an amount of water not substantially exceeding that amount required to dissolve the emulsifying agent present.

25. The dispersion described in claim 4 further characterized in that it contains an emulsifying agent.

26. The process of claim 16 further characterized in that an emulsifying agent and an amount of water not substantially exceeding that amount required to dissolve the emulsifying agent present have been added to the liquid prior to the dispersion of the halogen-2-butadiene-1,3.

WALLACE H. CAROTHERS.

CERTIFICATE OF CORRECTION.

Patent No. 2,080,558.                                                                May 18, 1937.

WALLACE HUME CAROTHERS.

It is hereby certified that error appears in the printed specification of the above numbered patent requiring correction as follows: Page 2, first column, lines 27, 28 and 29, and lines 60, 61 and 62, claims 2 and 10 respectively, strike out the words "is insoluble and which liquid does not prevent the polymerization of the chloro-2-butadiene-1, 3"; and that the said Letters Patent should be read with these corrections therein that the same may conform to the record of the case in the Patent Office.

Signed and sealed this 21st day of September, A. D. 1937.

Henry Van Arsdale (Seal)                                                Acting Commissioner of Patents.